United States Patent [19]

Knees

[11] 4,301,717

[45] Nov. 24, 1981

[54] COOKING UTENSILS

[76] Inventor: Hans Knees, via Queanbeyan, Burbong, New South Wales, Australia, 2620

[21] Appl. No.: 55,694

[22] Filed: Jul. 6, 1979

[30] Foreign Application Priority Data

Jul. 12, 1978 [AU] Australia ............................. PD5042

[51] Int. Cl.³ .......................... A47J 27/00; B01F 9/02
[52] U.S. Cl. ..................................... 99/348; 366/185; 366/220; 366/232
[58] Field of Search ........................ 99/327, 332, 348; 366/135, 145, 146, 185, 187, 194, 200, 204, 205, 222–224, 213, 232

[56] References Cited

U.S. PATENT DOCUMENTS 3,208,593 9/1965 Dietert ............................... 366/232
3,826,435 7/1974 Pujol ................................... 366/224
4,173,925 11/1979 Leon .................................. 366/232

Primary Examiner—Philip R. Coe
Assistant Examiner—Timothy F. Simone
Attorney, Agent, or Firm—Balogh, Osann, Kramer, Dvorak, Genova & Traub

[57] ABSTRACT

The invention concerns a utensil for cooking food. There is a container provided with an opening for insertion and removal of the foodstuffs to be cooked. The container is mounted on a stand and rotatable about a vertical axis. There is provision for tilting the container to a preselected position. A speed control to permit stirring of the ingredients is provided. Any suitable heating source may be used.

6 Claims, 2 Drawing Figures

COOKING UTENSILS

FIELD OF THE INVENTION

This invention deals with the ancient and revered art of food preparation for human consumption, i.e. cooking. Cooking is the art and science of preparing foods for the table, usually by heating them until they are changed in one or more of the following—flavour, tenderness, appearance and chemical composition. Thus cooking develops flavour and makes many foods more attractive in appearance. It also makes some foods easier to digest. Because the effect of food is so important to health, cooking has developed into a science and a plethora of cooking utensils has been developed, each having claimed specific advantages, covering everything from more rapid cooking and flavour enhancement to all-day simmering and vitamin retention.

DESCRIPTION OF THE PRIOR ART

Whether an electric fry-pan or a gas heated aluminium saucepan is used, problems generally arise in that foods tend to stick to the cooking utensil and eventually burn, which, apart from resulting in the ruining of the food, can also at worst ruin the utensil, or at best make is difficult to clean even with proprietary products comprising steel wool, powdered abrasives, or modern detergents. In any case cooking foods of the "liquid" (e.g. stews or custards) or "Discrete" types (e.g. Chinese foods such as fried rice or braised vegetable/meat dishes) require an even, controllable temperature.

To this end recipes for this type of cooking often specify continual stirring during the higher temperature phase of the operation—in fact Chinese cuisine (Cantonese style) is basically defined as stir-fry cooking done at a high temperature. Clearly the stirring is essential to avoid sticking and burning.

Similarly, in the art of sweets and confectionery cooking, high temperatures are required, as is constant stirring. On the other hand, dishes such as stews and casseroles are left to cook for hours at a low temperature and require little or no stirring. If these latter dishes could be cooked at a higher temperature, cooking time could be reduced but constant stirring to avoid burning and impairment of flavour would be required.

Having regarded to the problems referred to above, there is clearly a need for a type of cooking utensil which can operate at relatively high temperatures without causing burning of the ingredients. An attempt has been made to supply this need by providing fry-pans and saucepans with TEFLON (Registered Trade Mark) coatings. (TEFLON is a fully fluorinated copolymer of hexafluoropropylene and tetrafluoroethylene.)

These coatings certainly prevent the food from sticking to the bottom or walls of the utensils, but they still involve two major disadvantages. Firstly, the food can still burn, and secondly continued usage of the utensils at high temperatures destroys the coatings. A third disadvantage is that the coatings are adversely affected if touched with metallic objects such as metal spoons.

SUMMARY OF THE INVENTION

It is therefore the object of this invention to provide a cooking utensil which can be used at high or low temperatures without burning the food or causing sticking, and which therefore overcomes the problems and disadvantages hitherto experienced, and as discussed in the foregoing paragraphs.

Broadly this invention provides a container for ingredients to be cooked, an opening in said container for entering and removing said ingredients, said container being mounted on a stand so as to be rotatable about a normally upright axis, the mounting arrangement being such that the container can be tilted whereby said axis adopts an inclined attitude, means to retain said container in a position corresponding to a selected attitude of said axis, and means to rotate said container about said axis at a speed such that stirring but not centrifuging of ingredients contained therein will take place.

In a preferred embodiment the invention provides a cooking utensil comprising a container for ingredients to be cooked, said container including a base, side walls, and an open top for entering and removing said ingredients; a vessel enclosing the base and side walls of said container, said vessel including heating apparatus for said container; a shaft attached to the base of said container and protruding downwardly therefrom through said vessel, said shaft being rotatably held in a mounting frame, drive apparatus connected to rotate said shaft thereby to rotate said container about the axis thereof, said mounting frame including a tilting mechanism enabling said vessel and container to occupy an upright position suitable for entering ingredients into said container, a tipping position for expelling said ingredients, and selected intermediate inclined positions for stir-cooking, said tilting mechanism including a locking device for locking said tilting mechanism in one of said positions; and a variable speed control for said drive apparatus whereby when said vessel and container are in an inclined position, the speed of rotation of said container can be selected for various mixtures of ingredients to be cooked whereby stirring but not centrifuging thereof will take place.

DETAILED DESCRIPTION

A better appreciation of this invention can be gained by reference to the exemplary forms thereof illustrated in the accompanying drawings.

Figure 1:
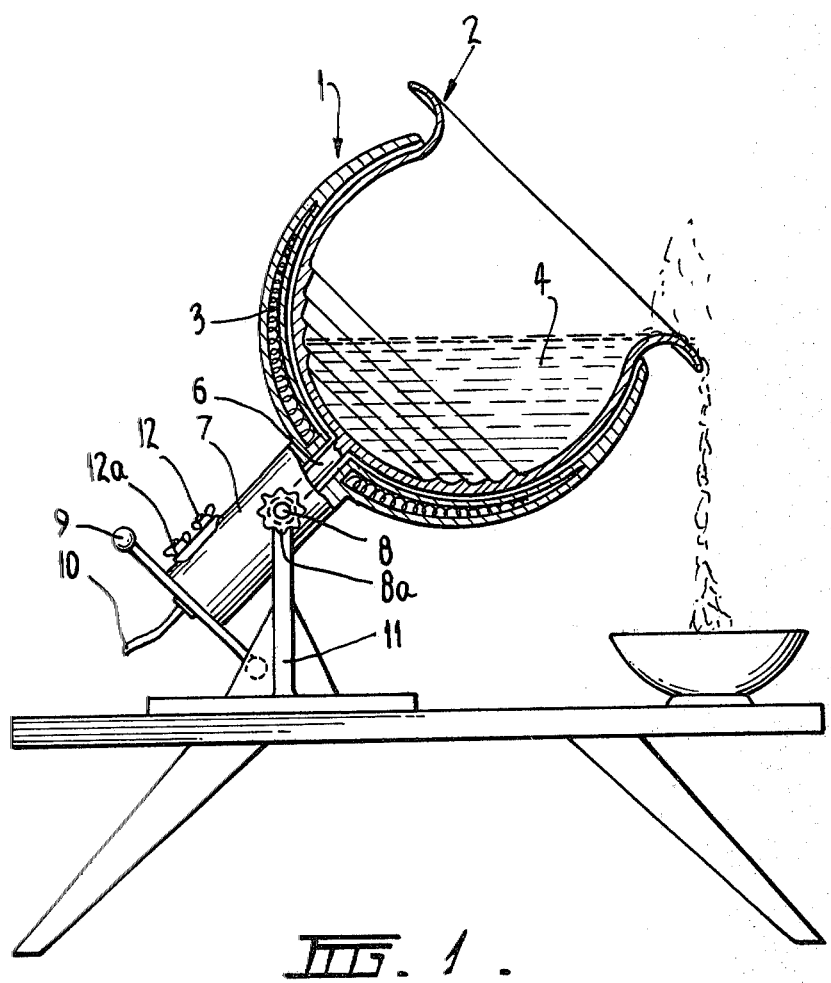
FIG. 1 schematically depicts a preferred cooking utensil disposed on a table.

Firstly having regard to FIG. 1, numeral 1 generally indicates a cooking utensil standing upon a table. An inner food container (2) holds ingredients (4) for cooking, and is enclosed by an insulated electrically heated vessel (3). Container (2) mounts shaft (6) which is rotatably supported within housing (7). Housing (7) encloses a motor (not shown) arranged to drive shaft (6) whereby to rotate inner container (2) at a speed such that the contents (4) are stirred and not centrifuged; the motor includes a speed control whereby to assure proper stirring for ingredients of varying viscosity which would centrifuge at different speeds. A stand (11) mounts the housing (7) about a pivot axis (8), and a wing nut, finger tightening device or the like (8a) is provided on a threaded shaft whereby to fix the inclination of the container (2) upon tightening thereof. If the container (2) is upright, the stirring action is least, but as the inclination increases, the stirring action becomes more vigorous, (i.e. for a fixed speed of rotation below the centrifuging speed).

Numeral (9) indicates a handle used to control tipping of the container (2) when emptying its contents (4). A power flex (10) supplies current to the motor and heating element which is preferably thermostatically controlled and also controlled by a timing mechanism to set the cooking time. Controls are indicated at (12),(12a). It should be noted that the elongate member projecting outwardly from the bottom of the container and defining the shaft 6 is rotatably mounted in a bearing which may be located in the housing (7).

It will be appreciated that the heating of container (2) need not be by electricity—it could in fact be by gas flame or by a barbecue flame of wood or coals. If such is the case, the enclosing vessel (3) is not used, in order that the flames impinge directly onto the container (2). If the device (1) is to be used outdoors over a barbecue flame, the rotation motor can be powered from an extension power flex or it may be arranged to be a battery operated motor, whereby there are no restrictions on location of use.

Figure 2:
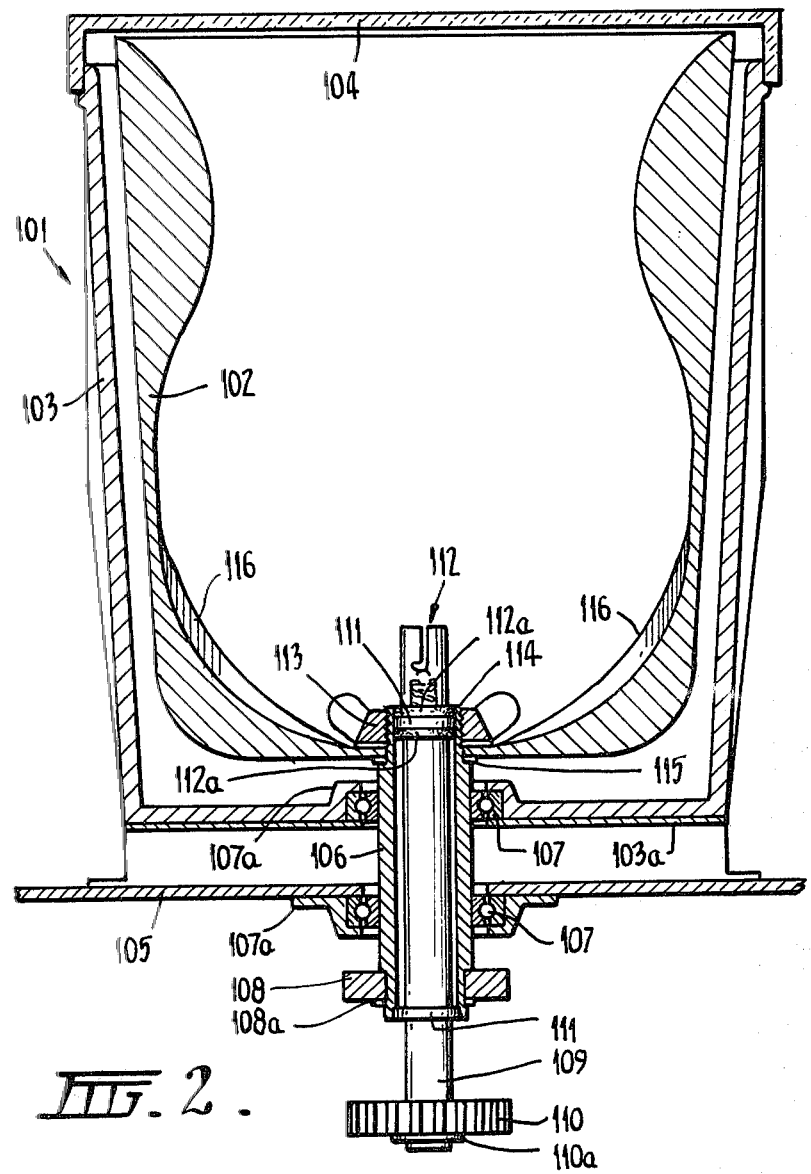
FIG. 2 schematically illustrates another embodiment fitted with a twin shaft device system fitted on a tiltable base plate.

FIG. 2 illustrates another embodiment of the invention with variations in constructional form from that of FIG. 1. The cooking utensil is generally identified by numeral 101—the (inner) food container 102 is freely supported, and rotatably mounted within an insulated electrically heated vessel 103. Vessel 103 is fitted with a lid 104 and the whole apparatus is constructed sufficiently solidly so that the utensil can be used as a pressure cooker. If desired, lid 104 can be provided with transparent view windows. Food container 102 is mounted on tubular shaft 106 which in turn is rotatable in a pair of ball or roller bearings 107, 107a (the latter numeral indicating the retainer rings for the bearings) respectively mounted in the base of vessel 103 and on a mounting plate 105. The upper end of shaft 106 is threaded as at 114 and a wing nut or other suitable threaded device screws thereon over the base of container 102. The base of the container 102 has an aperture through which shaft 106 protrudes and under the periphery thereof is a ring seal 115 which is tightened by device 113 between container 102 and a peripheral abutment on shaft 106. This arrnagement seals between shaft 106 and container 102, and also fixes these two integers together for rotation. Shaft 106 is rotated by means of an electrical motor via gear or pulley 108 and locking device 108a which fixes them 108 to shaft 106. Container 102 includes vanes 116 which assist in stirring the food during a cooking operation. As can be seen, by removing nut device 113, food container 102 can be simply removed from the utensil for cleaning or replacing. As stated, shaft 106 is tubular, and this permits an inner shaft 109 to be mounted therein on a pair of ball or roller bearings 111. This shaft protrudes into container 102 through the upper open end of shaft 106, and terminates in a fitting 112 for attachment of various tools e.g. stirrers, choppers, slicers, blenders, shredders etc. These tools can be individually attached in order to extend the utility of the cooking utensil into those areas usually predominated by mixers, grinders and blenders. Alternatively a "spit" can be attached which can support a roast or a bird for cooking. The fitting 112 is illustrated as a spring loaded bayonet coupling, but could be any other suitable fitting. Shaft 109 is driven by the same motor as drives shaft 106, via gear or pulley 110 which is fixed to the shaft 109 by locking device 110a. It will be appreciated that a separate motor could be used to drive shaft 109, but if there is only one motor, it is convenient to arrange that it drives by engaging wheels 108 and 110 at all times, and that a control is fitted to the apparatus for the purpose of an operator selecting locking or releasing of devices 108a, 110a, singly or together, as the case may be. It will also be appreciated that in view of the respective functions of the shafts 106, 109, the drive ratios are arranged so that shaft 109 can be driven at a relatively high speed, while shaft 106 can drive at a relatively low speed. In order to prevent leakage of the contents of container 102 around shaft 109 a pair of seal rings 112a are provided, one each side of the upper bearing 111. Mounting plate 105 constitutes the top cover (or part of it) of an enclosed housing which internally mounts the electrical motor(s), thermostat for the heater of vessel 103, the drives for shafts 106, 109, and ancillary gear, the switches, speed, temperature and function controls are mounted externally of the housing. Plate 105 is pivotable about a horizontal axis so that the cooking utensil food container pot 102 can be set at an inclined position during mixing-/cooking. A locking device is provided to enable it to be set in any inclined position, or a vertical position, or to free it for tipping to empty out the contents. The drive arrangement for the motor(s) is most simplified if the motor(s) are arranged to move with shafts 106, 109 as the utensil is tilted.

In exemplary tests of the actual performance of the invention various foods were cooked using a copper cooking pot, a bunsen burner (by no means an ideal heat source since only a minor proportion of the surface area was contacted by the flame).

EXAMPLE 1

A vegetable soup comprising carrots, potatoes, tomatoes, parsley, mushrooms, celery, with a small amount of water was placed in the pot and rotated at ten revolutions per minute. At the expiry of twelve minutes, the contents were served to a panel of five and judged to be properly cooked, palatable, and to have retained the natural flavours.

Using a higher rate of revolutions viz. twenty revolutions per minute, the test was repeated and at the end of six minutes, a soup of similar standard was obtained.

By comparison preparing a soup by conventional methods in a saucepan over an electric stove required some twenty to thirty minutes of cooking with spasmodic stirring to achieve a fully cooked result. By general consensus of the panel, the flavour and palatability was inferior to the soups prepared by the device of the invention.

EXAMPLE 2

Like experiments were carried out by cooking chicken pieces in a small quantity of water and cooking oil. A properly cooked dish was available after only eight minutes at a speed of twenty-five revolutions per minute and some twelve minutes at a speed of about fifteen revolutions per minute.

In a like manner an excellent beef stew was prepared from diced beef pieces in only eight minutes.

Having regard to the above examples and to the preparation of other meals it is apparent that the device of this invention has advantages including:
1. The device cooks more efficiently and faster than cooking utensils in current use.
2. The device can be used to mix foods *before* as well as during cooking.

3. A wide variety of foods from stir-fried Chinese cooking to English style custards can be cooked without any sticking to the container, or any burning.
4. There is less danger of accidents during cooking from confined steam, or hot fat splashing.
5. When cooking is finished, there is no need to scrape the container or to remove it for cleaning—the food is simply tipped out and the container can be readily cleaned in situ.
6. If the device is of the electric type, it can be made completely automatically operated on pre-set controls, i.e. temperature, time of heating at various temperatures, speed and amount of rotation can all be pre-set.

I claim:

1. A cooking utensil comprising a container for ingredients to be cooked, said container including a base, side walls, and an open top for entering and removing said ingredients; a vessel having a base and side walls enclosing the base and side walls of said container, said vessel including heating apparatus for said container; a shaft attached to the base of said container and protruding downwardly therefrom through said vessel, said container freely supported and rotatable within said vessel by means of said shaft, a mounting frame for supporting said vessel, a pair of bearings respectively mounted in the base of said vessel and on the mounting frame for rotatably holding said shaft in the mounting frame, a drive apparatus connected to rotate said shaft, and thereby to rotate said container about the axis thereof, said mounting frame being pivotable about a horizontal axis enabling said vessel and container to occupy an upright position suitable for entering ingredients into said container, a tipping position for expelling said ingredients, and selected intermediate inclined positions for stir-cooking, the mounting frame including a locking device for locking the mounting frame in one of said positions, and a variable speed control for said drive apparatus whereby when said vessel and container are in an inclined position, the speed of rotation of said container can be selected for various mixtures of ingredients to be cooked whereby stirring but not centrifuging thereof will take place.

2. A cooking utensil as claimed in claim 1 wherein said heating apparatus and said drive apparatus are electrically powered said utensil including a thermostat to control the temperature of said container, and a timing mechanism to control the time of cooking and the time of rotation of said container.

3. A cooking utensil as claimed in claim 1 or 2 wherein the connection of said drive apparatus to said shaft is such as to permit free axial movement of said shaft, whereby said container and shaft can be withdrawn from said vessel as a unit.

4. A cooking utensil comprising a container for ingredients to be cooked, said container including a base, side walls and an open top for entering and removing said ingredients, a vessel having a base and side walls enclosing the base and side walls of said container and including an electrical element for heating said container, a tubular shaft attached to the base of the container and protruding downwardly therefrom through said vessel, said container freely supported and rotatable within said vessel by means of said shaft, a mounting plate for supporting said vessel, a pair of bearings respectfully mounted in the base of said vessel and on the mounting plate, for rotatably holding said shaft in the mounting plate, said shaft passing through the mounting plate, an electric motor connectable to rotate said shaft and thereby to rotate said container about the axis thereof, said mounting plate forming a panel on the top of a housing and being held in said housing by a tilting mechanism enabling said plate, vessel and container to occupy an upright position suitable for entering ingredients into said container, a tipping position for expelling said ingredients, and selected intermediate inclined positions for stir-cooking, said tilting mechanism including a locking device for locking said plate, vessel and container in one of said positions; a second shaft mounted in bearings within said tubular shaft so as to be independently rotatable therein, said second shaft extending beyond said tubular shaft at either end into said housing and into said container, a seal positioned to seal the annular space between said shafts near the container end of said tubular shaft, said second shaft at its container end having an attachment device thereon adapted to receive one of a number of tools for performing different functional operations and at its other end being drivingly connectable to said motor, a selection control to connect said motor to one or the other of said shafts, a variable speed control for said motor whereby when said tubular shaft is being driven with said plate, vessel and container in an inclined position, the speed of rotation of said container can be selected for various mixtures of ingredients to be cooked whereby stirring but not centrifuging thereof will take place, and whereby when said second shaft is being driven, the speed of rotation thereof can be set sufficiently high for a selected one of said tools to be functionally operative, said motor, selection control and speed control being located in said housing.

5. A cooking utensil as claimed in claim 4 including a thermostat to control the temperature of said container, and a timing mechanism to control the time of cooking and the time of operation of said motor.

6. A cooking utensil as claimed in claim 4 or 5 wherein the container end of said tubular shaft has a peripheral abutment on which the periphery of the opening in the base of the container through which the shaft passes, sits, and the portions of said tubular shaft extending into said container is threaded to receive a complementary threaded nut device which screws down to hold the container in position fixed to said shaft, whereby said container can be readily removed from the cooking utensil on removal of said nut device.

* * * * *